(12) United States Patent
Yonekura et al.

(10) Patent No.: US 8,737,021 B2
(45) Date of Patent: May 27, 2014

(54) TERMINAL STRUCTURE, FLEXURE, AND HEAD SUSPENSION HAVING A TERMINAL FACE ON METAL LAYER CONNECTED TO WIRING LAYER

(71) Applicant: NHK Spring Co., Ltd., Yokohama (JP)

(72) Inventors: Ryosuke Yonekura, Kanagawa (JP); Yoshihiro Teramoto, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 13/764,527

(22) Filed: Feb. 11, 2013

(65) Prior Publication Data
US 2013/0242436 A1 Sep. 19, 2013

(30) Foreign Application Priority Data
Mar. 15, 2012 (JP) ................................. 2012-058244

(51) Int. Cl.
*G11B 5/60* (2006.01)
(52) U.S. Cl.
USPC ...................................................... 360/245.9

(58) Field of Classification Search
USPC ...................................................... 360/245.9
See application file for complete search history.

(56) References Cited

U.S. PATENT DOCUMENTS 8,149,542 B2 * 4/2012 Ando .......................... 360/245.8
8,390,958 B2 * 3/2013 Ohnuki et al. ............. 360/245.9

FOREIGN PATENT DOCUMENTS

JP 2010-086649 4/2010

* cited by examiner

*Primary Examiner* — Mark Blouin
(74) *Attorney, Agent, or Firm* — Jordan and Hamburg LLP

(57) ABSTRACT

A terminal structure includes an insulating layer hole formed through an insulating layer, a ground via that passes through the insulating layer hole and electrically connects a wiring layer formed on the insulating layer and a metal layer formed under the insulating layer to each other, and a terminal face defined on a surface of the metal layer and bonded through a conductive adhesive to an electrode of a piezoelectric element.

13 Claims, 17 Drawing Sheets

TERMINAL STRUCTURE, FLEXURE, AND HEAD SUSPENSION HAVING A TERMINAL FACE ON METAL LAYER CONNECTED TO WIRING LAYER

BACKGROUND OF THE INVENTION

1. Field of the Invention

The present invention relates to a terminal structure connected through a conductive adhesive to an electrode of a piezoelectric element and having a terminal face on a metal layer connected to a wiring layer, a flexure employing the terminal structure, and a head suspension employing the flexure.

2. Description of Related Art

Information devices are rapidly getting smaller and elaborated, and for use with such information devices, needs for micro-actuators capable of conducting positioning control for very small distances are increasing. The micro-actuators are highly needed by, for example, optical systems for correcting focuses and inclination angles, ink jet printers for controlling ink heads, and magnetic disk drives for controlling magnetic heads.

The magnetic disk drives increase their storage capacity by increasing the number of tracks per inch (TPI) of a magnetic disk, i.e., by narrowing the width of each track on the magnetic disk.

The magnetic disk drives, therefore, need an actuator capable of precisely positioning a magnetic head across tracks within a minute range.

To meet the need, Japanese Unexamined Patent Application Publication No. 2010-086649 discloses a head suspension with a dual actuator system. The dual actuator system employs a piezoelectric element in addition to a usual voice coil motor that drives a carriage to which the head suspension is attached. The piezoelectric element is arranged between a base plate and a load beam of the head suspension, to minutely move a magnetic head attached to a front end of the load beam.

According to the head suspension of the dual actuator system, the voice coil motor turns the head suspension through the carriage, and in addition, the piezoelectric element deforms in proportion to a voltage applied thereto, to minutely move the magnetic head at the front end of the load beam in a sway direction (a widthwise direction of the load beam) relative to the base plate. With this, the head suspension is able to precisely position the magnetic head to a target position on a magnetic disk.

The dual actuator system supplies electricity to the piezoelectric element through a flexure attached to the load beam. The flexure includes a terminal structure to electrically connect through a conductive adhesive as a conductive bonding part the flexure and piezoelectric element to each other.

FIGS. 19A, 19B, and 19C are views illustrating a terminal structure for a terminal of a flexure according to a related art.

In FIGS. 19A to 19C, the terminal 201 includes a metal layer 203, an insulating layer 205 formed on the metal layer 203, and a wiring layer 207 formed on the insulating layer 205. The metal layer 203 faces an electrode 211 of a piezoelectric element 209. Through the metal layer 203 and insulating layer 205, a through hole 213 is formed to expose a terminal face 215 of the wiring layer 207 toward the electrode 211 of the piezoelectric element 209.

The terminal face 215 is adhered to a conductive adhesive 217 that is filled in the through hole 213 between the terminal 201 and the piezoelectric element 209, thereby electrically connecting the wiring layer 207 of the terminal 210 to the electrode 211 of the piezoelectric element 209.

According to the related art, the terminal structure of the terminal 201 limits the terminal face 215 within an area of the wiring layer 207 exposed in the through hole 213. Namely, an adhering area of the terminal face 215 of the wiring layer 207 is limited by the through hole 213.

As a result, the terminal structure according to the related art is unstable in electrical connection between the terminal face 215 and the conductive adhesive 217 and is insufficient in bonding strength between the same.

In connection with the electrical connection between the terminal face 215 and the conductive adhesive 217, stress such as heat applied to the terminal face 215 and conductive adhesive 217 may temporarily break the electrical connection, and when the stress is removed, the electrical connection may resume. In this way, the electrical connection at the terminal structure according to the related art is unstable.

According to the related art, no improvement is expected in the unstableness of the electrical connection even if the terminal face 215 is gold-plated to improve electrical conductivity with respect to the conductive adhesive 217.

In connection with the bonding strength between the terminal face 215 and the conductive adhesive 217, peeling tests show that an interface between the terminal face 215 and the conductive adhesive 217 frequently breaks as adhesive failure even when the conductive adhesive 217 causes no breakage as cohesive failure. This means that, according to the related art, the bonding strength between the terminal face 215 and the conductive adhesive 217 is inferior.

In this way, the terminal structure according to the related art is unstable in electrical connection and weak in bonding strength between the terminal face 215 and the conductive adhesive 217.

SUMMARY OF THE INVENTION

An object of the present invention is to provide a terminal structure that is stable in electrical connection and strong in bonding strength between a terminal face and a conductive bonding part, a flexure employing the terminal structure, and a head suspension employing the flexure.

In order to accomplish the object, an aspect of the present invention provides a terminal structure to be applied to a flexure of a head suspension. The terminal structure has a metal layer, an insulating layer formed on the metal layer, and a wiring layer formed on the insulating layer, the metal layer facing an electrode of a piezoelectric element, the wiring layer being electrically connected through a conductive bonding part to the electrode of the piezoelectric element. The terminal structure includes an insulating layer hole formed through the insulating layer in a layered direction of the terminal structure, a conducting part passing through the insulating layer hole and electrically connecting the wiring layer and metal layer to each other, and a terminal face defined on a surface of the metal layer and bonded through the conductive bonding part to the electrode of the piezoelectric element.

According to this aspect of the present invention, the terminal face is defined on the whole surface of the metal layer and is faced toward the electrode of the piezoelectric element. Namely, the terminal face has an expanded connection area with respect to the conductive bonding part to stabilize electrical connection to the conductive bonding part and improve bonding strength with respect to the same.

BRIEF DESCRIPTION OF THE DRAWINGS

FIGS. 5A, 5B, and 5C are views illustrating the terminal structure according to the first embodiment, in which FIG. 5A is a plan view, FIG. 5B a back view, and FIG. 5C a sectional view taken along a line V-V of FIG. 1;

FIGS. 6A, 6B, and 6C are views illustrating a terminal structure according to a modification of the first embodiment, in which FIG. 6A is a plan view, FIG. 6B a back view, and FIG. 6C a sectional view corresponding to a sectional view taken along the line V-V of FIG. 1;

FIGS. 7A and 7B are views illustrating a terminal structure according to a second embodiment of the present invention, in which FIG. 7A is a sectional view corresponding to a sectional view taken along the line V-V of FIG. 1 and FIG. 7B an enlarged partial view of FIG. 7A;

FIGS. 8A, 8B, and 8C are views illustrating a terminal structure according to a third embodiment of the present invention, in which FIG. 8A is a plan view, FIG. 8B a back view, and FIG. 8C a sectional view corresponding to a sectional view taken along the line V-V of FIG. 1;

FIGS. 9A, 9B, and 9C are views illustrating a terminal structure according to a modification of the third embodiment, in which FIG. 9A is a plan view, FIG. 9B a back view, and FIG. 9C a sectional view corresponding to a sectional view taken along the line V-V of FIG. 1;

FIGS. 10A, 10B, and 10C are views illustrating a terminal structure according to another modification of the third embodiment, in which FIG. 10A is a plan view, FIG. 10B a hack view, and FIG. 10C a sectional view corresponding to a sectional view taken along the line V-V of FIG. 1;

FIGS. 11A, 11B, and 11C are views illustrating a terminal structure according to still another modification of the third embodiment, in which FIG. 11A is a plan view, FIG. 11B a back view, and FIG. 11C a sectional view corresponding to a sectional view taken along the line V-V of FIG. 1;

FIGS. 12A, 12B, and 12C are views illustrating a terminal structure according to still another modification of the third embodiment, in which FIG. 12A is a plan view, FIG. 12B a hack view, and FIG. 12C a sectional view corresponding to a sectional view taken along the line V-V of FIG. 1;

FIGS. 13A, 13B, and 13C are views illustrating a terminal structure according to still another modification of the third embodiment, in which FIG. 13A is a plan view, FIG. 13B a back view, and FIG. 13C a sectional view corresponding to a sectional view taken along the line V-V of FIG. 1;

FIGS. 14A, 14B, and 14C are views illustrating a terminal structure according to still another modification of the third embodiment, in which FIG. 14A is a plan view, FIG. 14B a back view, and FIG. 14C a sectional view corresponding to a sectional view taken along the line V-V of FIG. 1;

FIGS. 15A, 15B, and 15C are views illustrating a terminal structure according to a fourth embodiment of the present invention, in which FIG. 15A is a plan view, FIG. 15B a back view, and FIG. 15C a sectional view corresponding to a sectional view taken along the line V-V of FIG. 1;

FIGS. 16A, 16B, and 16C are views illustrating a terminal structure according to a fifth embodiment of the present invention, in which FIG. 16A is a plan view, FIG. 16B a hack view, and FIG. 16C a sectional view corresponding to a sectional view taken along the line V-V of FIG. 1;

FIGS. 17A, 17B, and 17C are views illustrating a terminal structure according to a modification of the fifth embodiment, in which FIG. 17A is a plan view, FIG. 17B a back view, and FIG. 17C a sectional view corresponding to a sectional view taken along the line V-V of FIG. 1;

FIGS. 18A, 18B, and 18C are views illustrating a terminal structure according to another modification of the fifth embodiment, in which FIG. 18A is a plan view, FIG. 18B a back view, and FIG. 18C a sectional view corresponding to a sectional view taken along the line V-V of FIG. 1; and FIGS. 19A, 19B, and 19C are views illustrating a terminal structure according to a related art, in which FIG. 19A is a plan view, FIG. 19B a back view, and FIG. 19C a sectional view corresponding to a sectional view taken along the line V-V of FIG. 1.

DETAILED DESCRIPTION OF EMBODIMENTS

Embodiments of the present invention will be explained. Each embodiment forms an insulating layer hole through an insulating layer at a terminal of a flexure of a head suspension, electrically connects, with a conducting part passing through the insulating layer hole, a wiring layer formed on the insulating layer to a metal layer formed under the insulating layer, thereby using a face of the metal layer as a terminal face that is bonded through a conductive bonding part to an electrode of a piezoelectric element. This configuration stabilizes electrical connection between the terminal face and the conductive bonding part and improves bonding strength between them.

It is preferable to form a gold-plate layer on the terminal face.

It is preferable to partly expose the metal layer through the gold-plate layer. This will be realized by forming the gold-plate layer by flash plating, or by partly forming the gold-plate layer on the metal layer.

It is preferable to provide the terminal face with a recess in a layered direction of the terminal structure. The recess may be formed in the metal layer, or may be formed as a recess hole passing at least through the metal layer. In the case of the recess hole, it may be formed through the metal layer and insulating layer, or through the metal layer, insulating layer, and wiring layer.

A first embodiment will be explained in detail with reference to FIGS. 1 to 5C.

Figure 1:
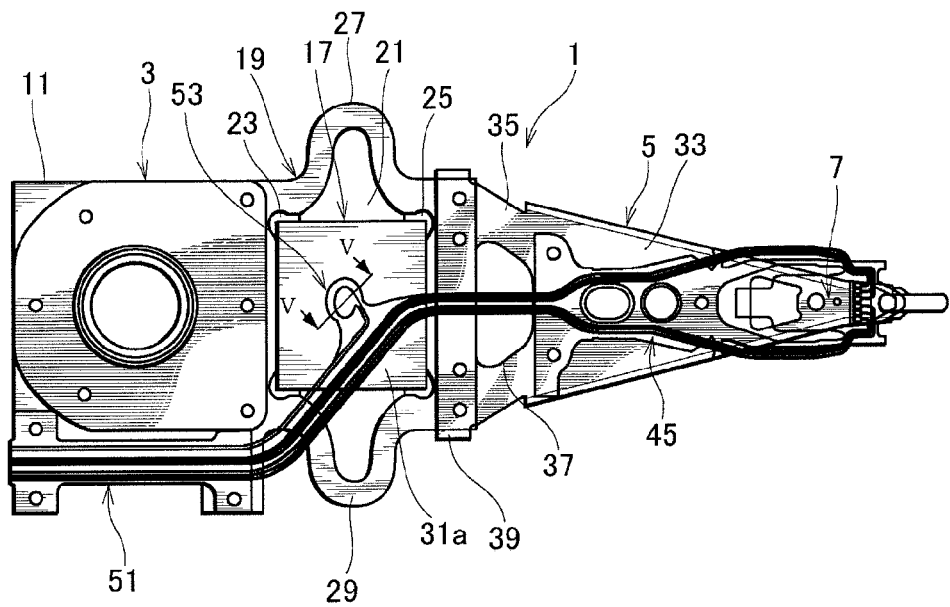
FIG. 1 is a plan view illustrating a head suspension with a flexure employing a terminal structure according to a first embodiment of the present invention.
Figure 2:
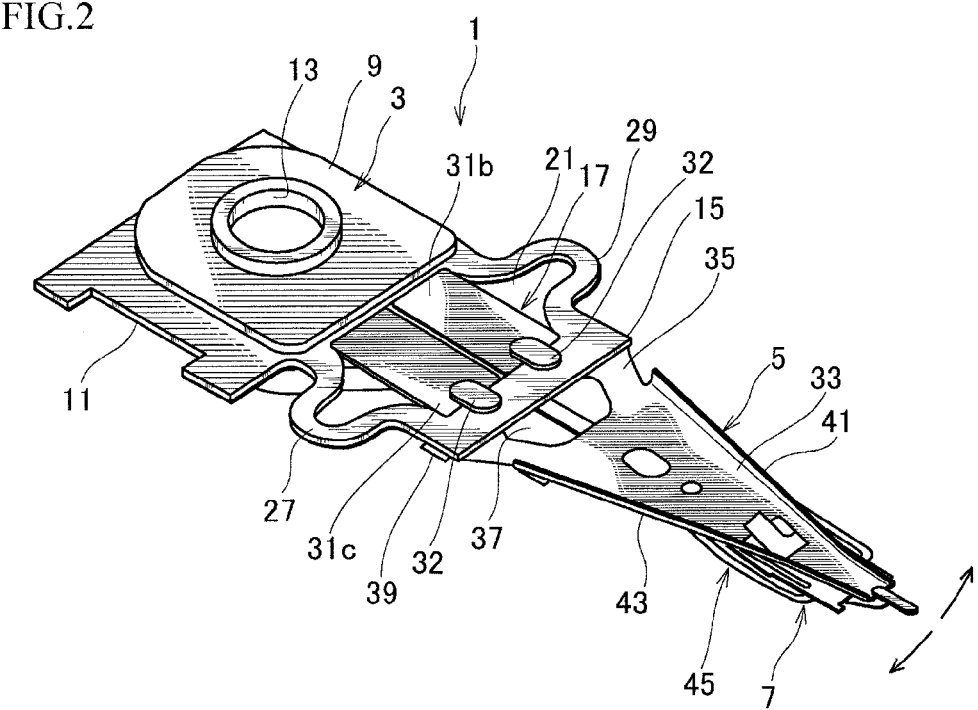
FIG. 2 is a perspective view illustrating a back side of the head suspension of FIG. 1.

FIG. 1 is a plan view illustrating a head suspension with a flexure employing a terminal structure according to the first embodiment of the present invention and FIG. 2 is a perspective view illustrating a back side of the head suspension of FIG. 1.

In FIGS. 1 and 2, the head suspension 1 has a base 3, a load beam 5 supported by the base 3, and a head 7 supported at a front end of the load beam 5. The head 7 is used to write and read data to and from a magnetic disk in a disk drive.

The base 3 includes a base plate 9 made of conductive material such as stainless steel and a reinforcing, plate 11 made of conductive material such as stainless steel. A base end area of the reinforcing plate 11 is laid on the base plate 9 and is fixed thereto by, for example, laser welding.

The base plate 9 has a boss 13 with which the head suspension 1 is attached to a carriage (not illustrated). The carriage is attached to and driven by a voice coil motor (not illustrated), to turn the head suspension 1.

A front end area of the reinforcing plate 11 forms a connection part 15 to which the load beam 5 is connected. At a base end of the connection part 15, the reinforcing plate 11 has a fitting part 19 for a piezoelectric element 17.

The fitting part 19 includes an opening 21 to accommodate the piezoelectric element 17. The opening 21 is provided with fitting flanges 23 and 25 formed by, for example, etching. The piezoelectric element 17 is fixed in the opening 21 with a nonconductive adhesive. On each side of the opening 21, there are flexible parts 27 and 29.

The piezoelectric element 17 is made of rectangular piezoelectric ceramics such as rectangular PZT (piezoelectric zirconate titanate). On a first face of the piezoelectric element 17, a common electrode 31a is formed by gold-plating, and on a second face thereof, a pair of electrodes 31b and 31c are formed by gold-plating.

Arranged between the base 3 and the load beam 5, the piezoelectric element 17 deforms according to a voltage applied through the electrodes 31a, 31b, and 31c, to thereby minutely move the head 7 of the load beam 5 in a sway direction (a widthwise direction of the load beam 5 or the head suspension 1) with respect to the base 3.

With this, the head suspension 1 is capable of carrying out turn motions by the voice coil motor and minute motions by the piezoelectric element 17.

The electrodes 31b and 31c are grounded through a conductive adhesive 32 to the reinforcing plate 11 and the electrode 31a is connected to a terminal 53 of a flexure 45 to be explained later.

The load beam 5 is fixed to the connection part 15 of the base 3 by, for example, laser welding and applies load onto the head 7. The load beam 5 is made of, for example, a thin stainless steel plate and includes a rigid part 33 and a resilient part 35.

The resilient part 35 is forked with a window 37 to lower bending rigidity in a thickness direction. A base end of the resilient part 35 is a connection part 39 connected to the connection part 15 of the base 3.

The rigid part 33 extends from the resilient part 35 toward the front end of the load beam 5 and has rails 41 and 43 raised in a thickness direction and extending along each edge of the rigid part 33.

The front end of the rigid part 33 supports, through the flexure 45, a slider (not illustrated) of the head 7.

Figure 3:
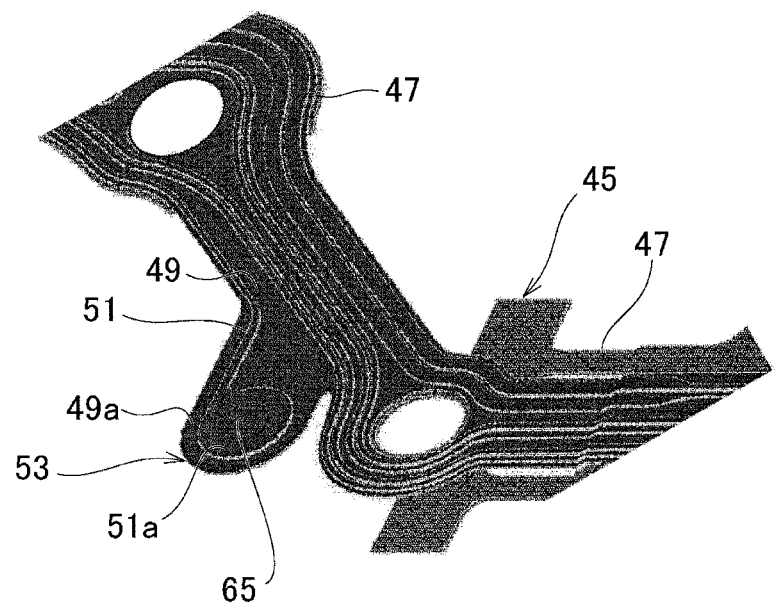
FIG. 3 is a perspective view illustrating a terminal area of the flexure of the head suspension of FIG. 1, the terminal area including the terminal structure.
Figure 4:
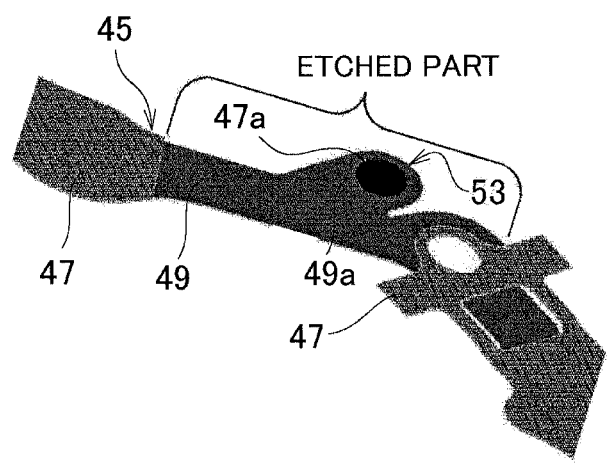
FIG. 4 is a perspective view illustrating a back side of the terminal area of FIG. 3.

The flexure 45 will be explained in detail with reference to FIGS. 3 and 4 in which FIG. 3 is a perspective view illustrating a terminal area of the flexure 45 and FIG. 4 is a back view of FIG. 3. In FIGS. 3 and 4, an example of the flexure 45 slightly differs from the flexure 45 illustrated in FIGS. 1 and 2, but it has the same basic structure as that of the flexure 45 illustrated in FIGS. 1 and 2.

The flexure 45 includes a metal layer 47, an insulating layer 49 formed on the metal layer 47, and a wiring layer 51 formed on the insulating layer 49. The wiring layer 51 is covered with a cover insulating layer (not illustrated). The cover insulating layer may be omitted.

The metal layer 47 is made of a conductive thin plate such as a thin resilient stainless steel rolled plate and has a thickness of, for example, about 10 to 25 micrometers.

The insulating layer 49 is made of insulating material such as polyimide and has a thickness of, for example, about 5 to 15 micrometers.

The wiring layer 51 is formed into predetermined patterns and has a thickness of, for example, about 8 to 15 micrometers. A first end of the wiring layer 51 is electrically connected to the slider of the head 7 as illustrated in FIG. 1 and a second end thereof is connected to a terminal for external connection (not illustrated).

An intermediate part of the flexure 45 has the terminal 53 connected to the electrode 31a of the piezoelectric element 17. The terminal 53 is defined by removing the metal layer 47 of the flexure 45 in the surrounding area thereof. Removal of the metal layer 47 is carried out by, for example, etching. The terminal 53 has the terminal structure according to the first embodiment of the present invention.

Figure 5A:
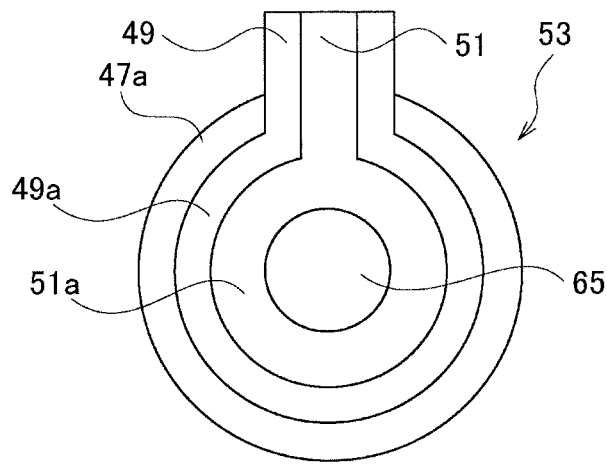
Figure 5B:
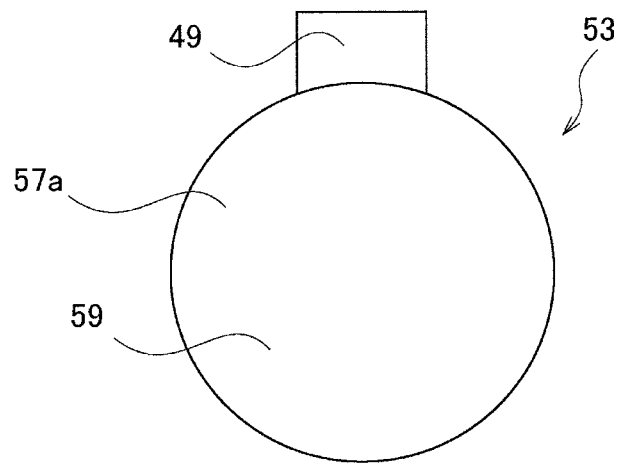
Figure 5C:
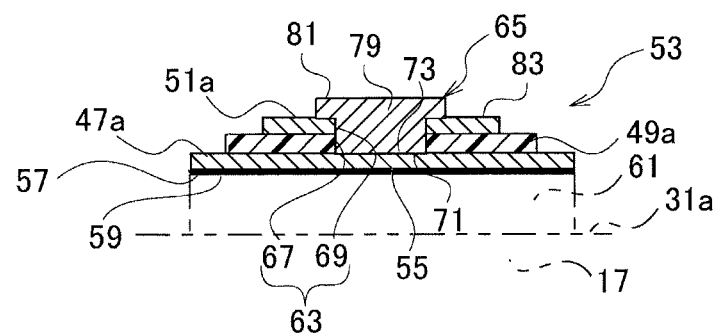

The terminal structure of the terminal 53 will be explained in detail with reference to FIGS. 5A, 5B, and 5C in which FIG. 5A is a plan view, FIG. 5B a back view, and FIG. 5C a sectional view taken along the line V-V of FIG. 1.

Like the flexure 45, the terminal 53 has a metal layer 47a, an insulating layer 49a formed on the metal layer 47a, and a wiring layer 51a formed on the insulating layer 49a.

The metal layer 47a of the terminal 53 is a circular plate and is separated from the metal layer 47 of a main body the flexure 45. The metal layer 47a faces the electrode 31a of the piezoelectric element 17. A surface 55 of the metal layer 47a is covered with a gold-plate layer 57 to form a terminal face 59. The terminal face 59 is bonded to the electrode 31a of the piezoelectric element 17 with a conductive adhesive 61 such as silver paste, the conductive adhesive 61 serving as a conductive boding part according to the first embodiment. However, the silver paste is replaceable with solder, an isotropic conductive tape, an anisotropic conductive tape, or the like as the conductive bonding part.

The insulating layer 49a is a circular plate and has a smaller diameter than the metal layer 47a. The wiring layer 51a is a circular plate and has a smaller diameter than the insulating layer 49a. The metal layer 47a, insulating layer 49a, and wiring layer 51a are concentric.

The terminal 53 has a via hole 63 and a ground via 65 as a conducting part.

The via hole 63 includes an insulating layer hole 67 and a wiring layer hole 69. The insulating layer hole 67 is a circular hole with a circular cross-section and is formed through a central part of the insulating layer 49a in the layered direction of the terminal structure or the terminal 53. The insulating layer hole 67 communicates with the wiring layer hole 69. The wiring layer hole 69 has nearly the same sectional shape as the insulating layer hole 67 and is formed through a central part of the wiring layer 51a in the layered direction of the terminal 53. In the insulating layer hole 67 and wiring layer hole 69, the ground via 65 is formed.

The ground via 65 is made of a conductive material by, for example, plating such as nickel-plating. The ground via 65 fills the wiring layer hole 69 and insulating layer hole 67 of the via hole 63. Accordingly, the ground via 65 is cylindrical corresponding to the via hole 63.

An end face 71 of the ground via 65 in the via hole 63 adheres to a back face 73 of the metal layer 47a. An outer circumferential face of the ground via 65 adheres to an inner circumferential face of the via hole 63, i.e., inner circumferential faces of the insulating layer hole 67 and wiring layer hole 69.

On the opposite side of the metal layer 47a, the ground via 65 has a protrusion 79 protruding out of the via hole 63. The protrusion 79 has a circumferential flange 81 that adheres to a face 83 of the wiring layer 51a.

The metal layer 47a of the terminal 53 is electrically connected through the ground via 65 to the wiring layer 51a, and therefore, the surface 55 of the metal layer 47a functions as the terminal face 59.

Effects of the first embodiment of the present invention will be explained.

The terminal structure according to the first embodiment has the metal layer 47a, the insulating layer 49a formed on the metal layer 47a, and the wiring layer 51a formed on the insulating layer 49a. The metal layer 47a faces the electrode 31a of the piezoelectric element 17. The wiring layer 51a is electrically connected through the conductive adhesive 61 to the electrode 31a of the piezoelectric element 17. The terminal structure includes the insulating layer hole 67 formed through the insulating layer 49a in the layered direction of the terminal structure, the ground via 65 that passes through the insulating layer hole 67 and electrically connects the wiring layer 51a and metal layer 47a to each other, and the terminal face 59 that is defined on the surface 55 of the metal layer 47a and is bonded through the conductive adhesive 61 to the electrode 31a of the piezoelectric element 17.

With this configuration, the first embodiment entirely uses the surface 55 of the metal layer 47a as the terminal face 59 that faces the electrode 31a of the piezoelectric element 17. The first embodiment has no limit that exists in the related art in order to secure the terminal face 59.

Namely, the first embodiment is able to secure a wider area for the terminal face 59 than that of the related art. With the wide terminal face 59 with respect to the conductive adhesive 61, the first embodiment stabilizes electrical connection between the terminal face 59 and the conductive adhesive 61 and improves bonding strength between the same. In other words, the terminal face 59 has an expanded connection area with respect to the conductive adhesive 61 to stabilize electrical connection to the conductive adhesive 61 and improve bonding strength with respect to the same.

According to the first embodiment, the wiring layer 51a has the wiring layer hole 69 corresponding to the insulating layer hole 67 and the ground via 65 is made of conductive material filled in the wiring layer hole 69 and insulating layer hole 67. The ground via 65 is easily and surely formed in the wiring layer hole 69 and insulating layer hole 67.

According to the first embodiment, the metal layer 47a is the circular plate without holes, to improve the strength of the terminal 53 as a whole.

According to the first embodiment, the insulating layer 49a is the circular plate and has the smaller diameter than the metal layer 47a and the wiring layer 51a is the circular plate and has the smaller diameter than the insulating layer 49a. The metal layer 47a, insulating layer 49a, and wiring layer 51a are concentric. This configuration expands a connection area of the terminal face 59 and secures the rigidity of the terminal 53.

The flexure 45 employing the terminal structure according to the first embodiment is capable of stably and surely supplying electricity to the piezoelectric element 17.

The head suspension 1 employing the flexure 45 according to the first embodiment is capable of stably deforming the piezoelectric element 17 and driving the head 7 within a very short range.

Figure 6A:
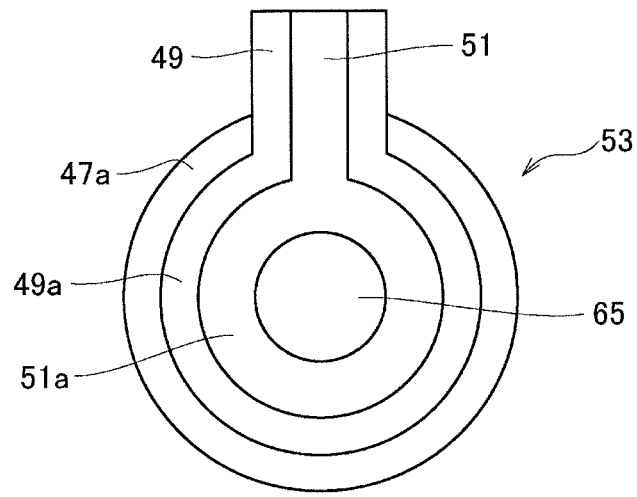
Figure 6B:
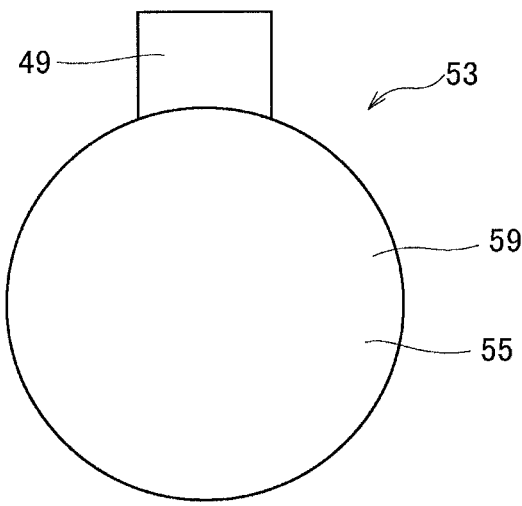
Figure 6C:
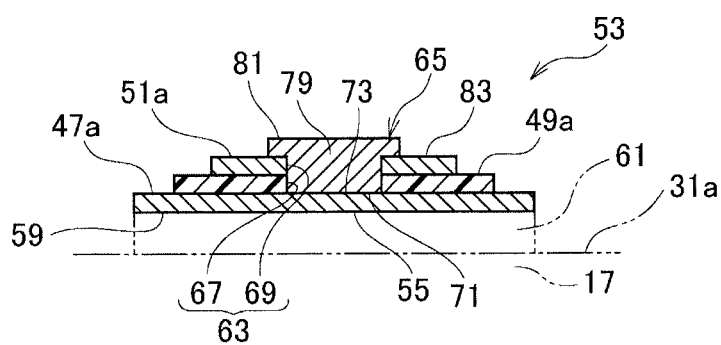

A modification of the first embodiment of the present invention will be explained with reference to FIGS. 6A, 6B, and 6C in which FIG. 6A is a plan view, FIG. 6B a back view, and FIG. 6C a sectional view taken along the line V-V of FIG. 1.

The modification omits the gold-plate layer 57 formed on the terminal face 59 of the terminal 53 of the first embodiment. Namely, according to the modification, the surface 55 itself of the metal layer 47a of the terminal 53 serves as the terminal face 59.

This modification provides effects similar to those of the first embodiment. In addition, the terminal face 59, i.e. the surface 55 of the metal layer 47a well adheres to the conductive adhesive 61, to improve bonding strength between the terminal face 59 and the conductive adhesive 61.

Figure 7A:
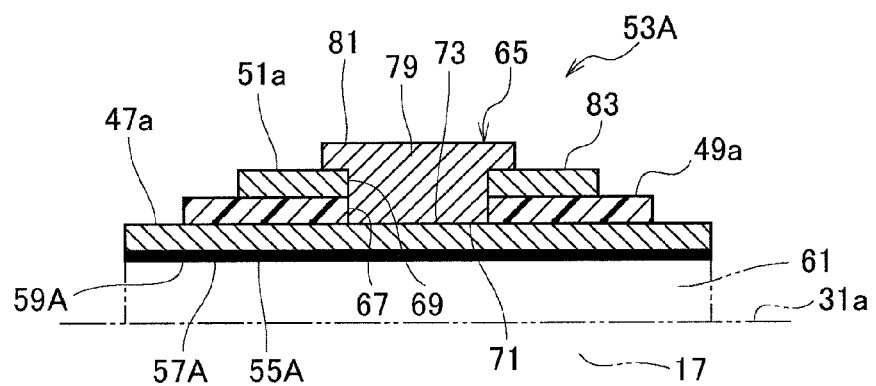
Figure 7B:
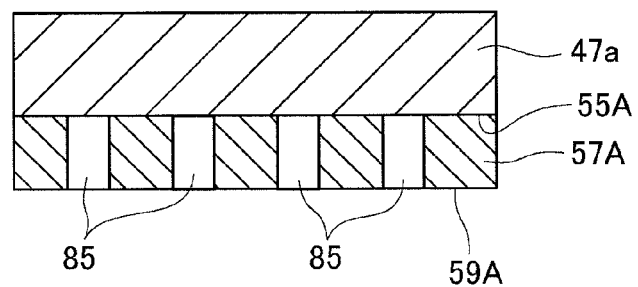

A terminal structure according to a second embodiment of the present invention will be explained with reference to FIGS. 7A and 7B in which FIG. 7A is a sectional view corresponding to a sectional view taken along the line V-V of FIG. 1 and FIG. 7B an enlarged partial view of FIG. 7A. The second embodiment is similar to the first embodiment, and therefore, corresponding parts are represented with like reference numerals or like reference numerals plus "A" to omit overlapping explanations.

Compared with the first embodiment, the second embodiment forms a gold-plate layer 57A on a metal layer 47Aa of a terminal 53A so as to partially expose a surface 55A of the metal layer 47Aa.

The gold-plate layer 57A is formed by flash plating or by plating with diffusion treatment. The flash plating forms a very thin gold-plate layer of for example, 0.1 micrometers or thinner. With this thinness, the gold-plate layer formed by flash plating has many pinholes. The plating with diffusion treatment carries out a surface diffusion treatment by, for example, applying heat to expose the surface 55A of the metal layer 47Aa through pinholes of the gold-plate layer 57A.

The second embodiment employs such a plating technique to partially expose the surface 55A of the metal layer 47Aa through the pinholes 85 of the gold-plate layer 57A. Namely, a terminal face 59A according to the second embodiment is a mixture of gold-plate components and metal-layer components.

With the mixture of gold-plate and metal-layer components, the terminal face 59A according to the second embodiment improves electrical connectivity with respect to a conductive adhesive 61 due to the gold-plate components and increases bonding strength with respect to the same due to the metal-layer components.

In addition, the pinholes 85 of the gold-plate layer 57A according to the second embodiment roughen the terminal face 59A, thereby securing the bonding strength with respect to the conductive adhesive 61.

Figure 8A:
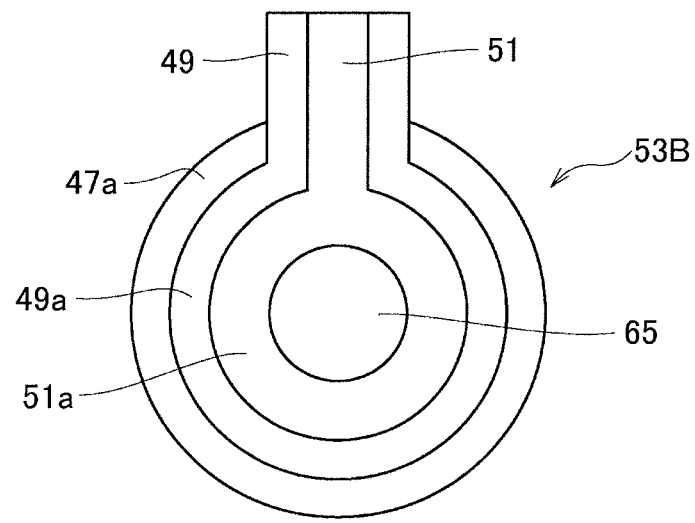
Figure 8B:
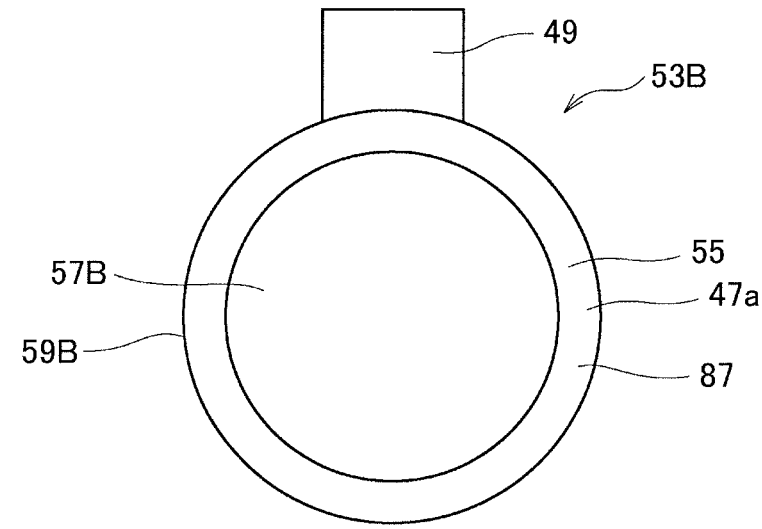
Figure 8C:
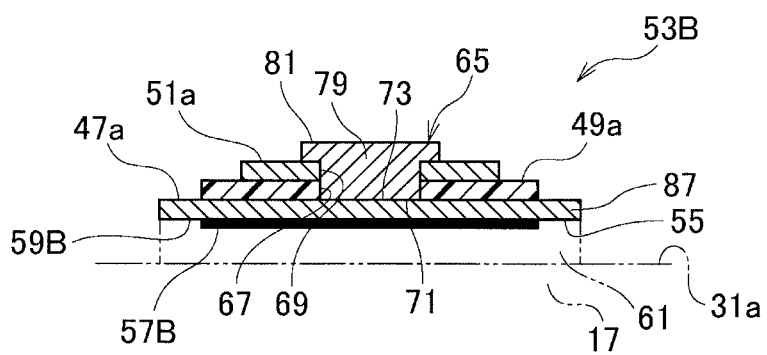

A terminal structure according to a third embodiment of the present invention will be explained with reference to FIGS. 8A, 8B, and 8C in which FIG. 8A is a plan view, FIG. 8B a back view, and FIG. 8C a sectional view taken along the line V-V of FIG. 1. The third embodiment is similar to the first and second embodiments, and therefore, corresponding parts are represented with like reference numerals or like reference numerals plus "B" to omit overlapping explanations.

The third embodiment partly exposes a surface 55 of a metal layer 47a, like the second embodiment.

Unlike the second embodiment that partially exposes the surface 55A of the metal layer 47Aa with the use of the characteristics of the gold-plate layer 57A, the third embodiment partly forms a gold-plate layer 57B on the surface 55 of the metal layer 47a.

The third embodiment forms the gold-plate layer 57B into a circular plate having a smaller diameter than the metal layer 47a and is concentric with the same. According to the third embodiment, the gold-plate layer 57B has substantially the same diameter as an insulating layer 49a.

The gold-plate layer 57B is partly formed in a central area of the metal layer 47a excluding a circumferential peripheral area 87 of the metal layer 47a. Namely, the surface 55 of the metal layer 47a is exposed in the circumferential peripheral area 87, to form a terminal face 59B together with the gold-plate layer 57B.

Partly forming the gold-plate layer 57B is realized by employing a mask during gold plating, or by entirely gold-plating the surface 55 of the metal layer 47 and partly removing the plated gold by laser irradiation.

Like the gold-plate layer 57A of the second embodiment, the gold-plate layer 57B of the third embodiment may be formed by flash plating or by plating with diffusion treatment.

According to the third embodiment, the terminal face 59B is a mixture of gold-plate component and metal-layer component, to provide effects similar to those of the second embodiment.

According to the third embodiment, the metal-layer component is present in the circumferential peripheral area 87 of the terminal face 59B, to surely improve bonding strength with respect to a conductive adhesive 61.

Terminal structures according to modifications of the third embodiment will be explained with reference to FIGS. 9A to 14C. The modifications form the gold-plate layer 57B into different plan shapes. The gold-plate layer 57B may have any plan shape other than those of the modifications.

Figure 9A:
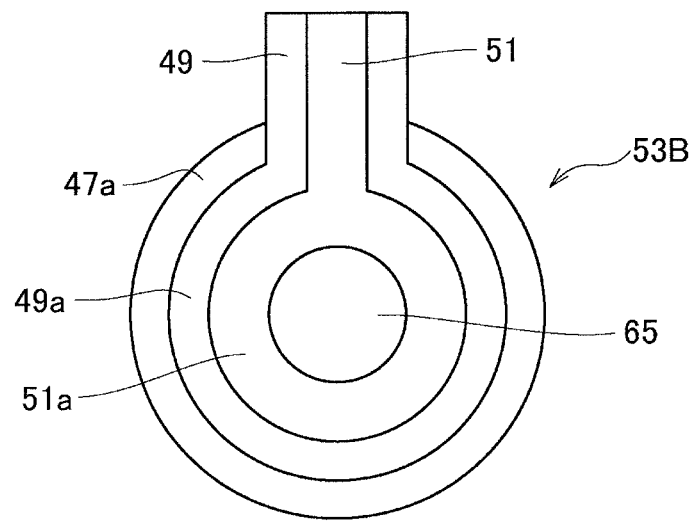
Figure 9B:
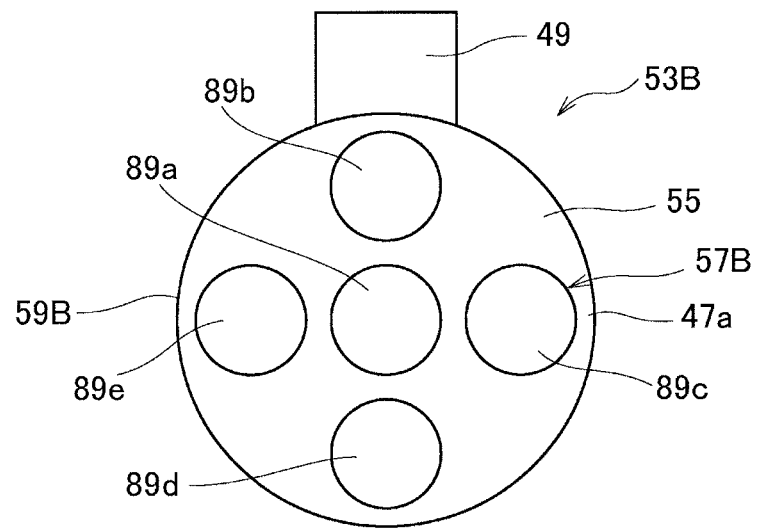
Figure 9C:
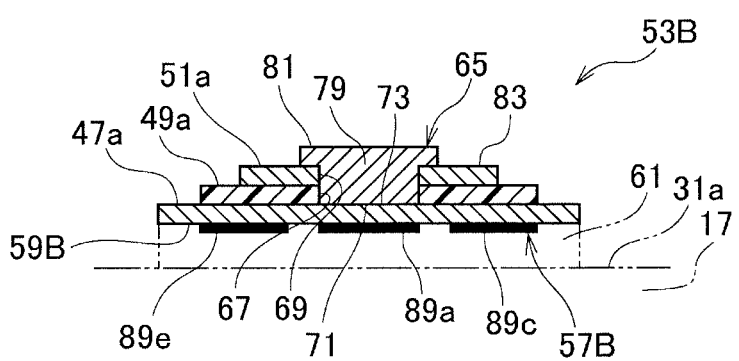

The modification illustrated in FIGS. 9A, 9B, and 9C forms the gold-plate layer 57B into a plurality of circular plated sections 89a to 89e arranged in a cross configuration.

The plated sections 89a to 89e each substantially have the same diameter as a ground via 65. The central plated section 89a is concentric with the ground via 65. The remaining plated sections 89b to 89e are arranged around the central plated section 89a at intervals of 90 degrees.

The plurality of plated sections may be formed in any configuration on the surface 55 of the metal layer 47a. The number and plan shape of the plated sections are optional. For example, each plated section may have a rectangular plan shape or a circular plan shape whose diameter may be larger or smaller than that of the ground via 65.

Figure 10A:
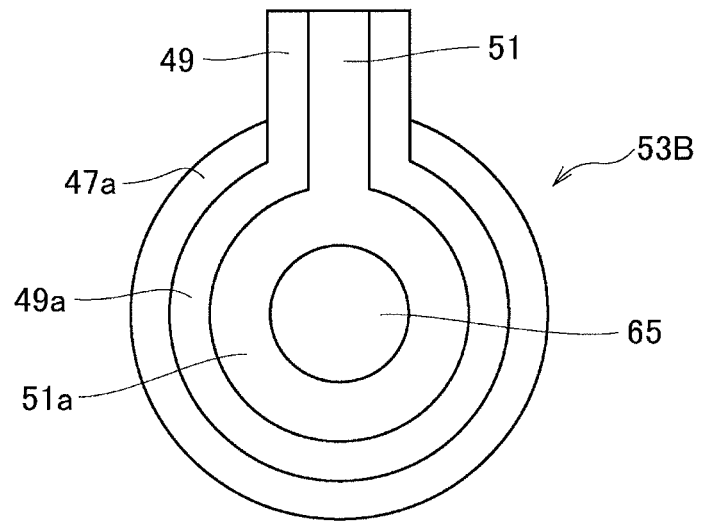
Figure 10B:
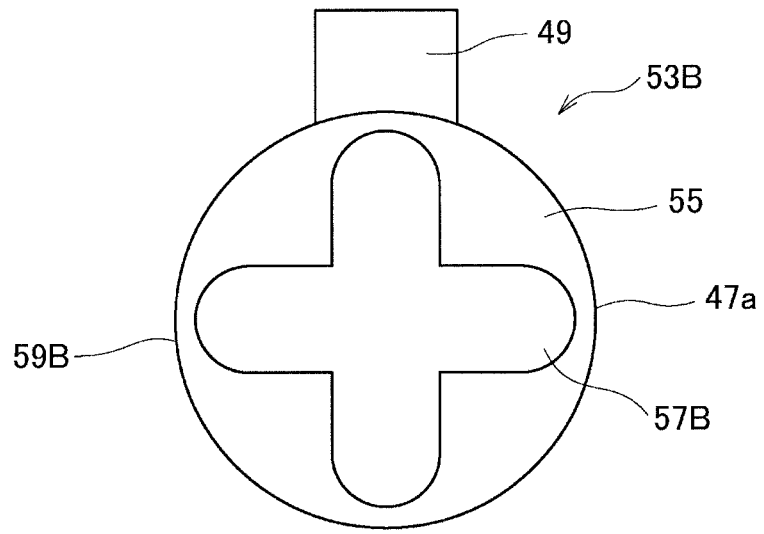
Figure 10C:
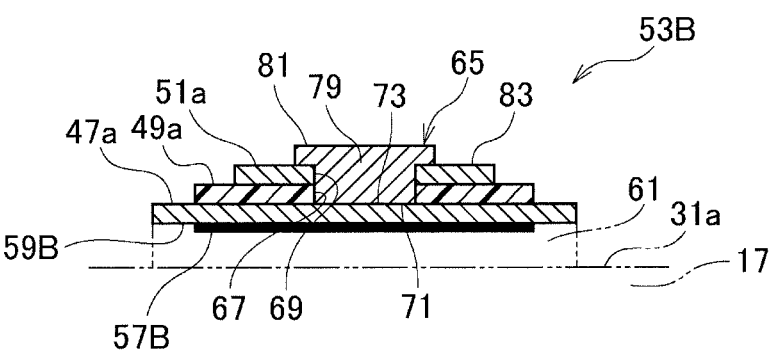

The modification illustrated in FIGS. 10A, 10B, and 10C forms the gold-plate layer 57B into a cross shape that corresponds to an integration of the circular plated sections 89a to 89e of the modification illustrated in FIGS. 9A to 9C.

Figure 11A:
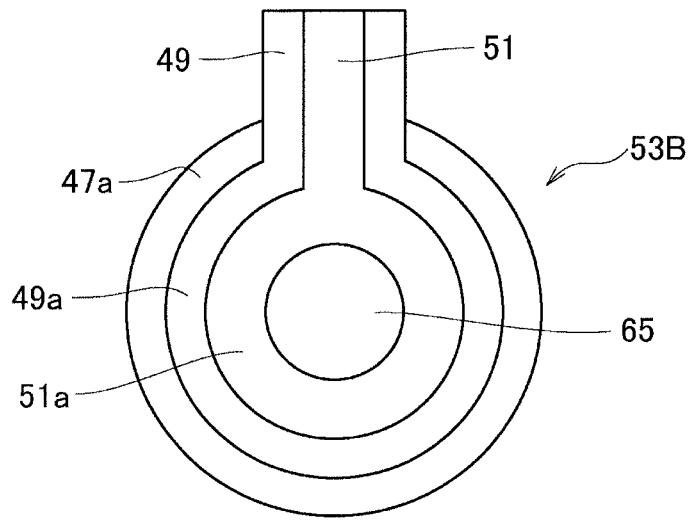
Figure 11B:
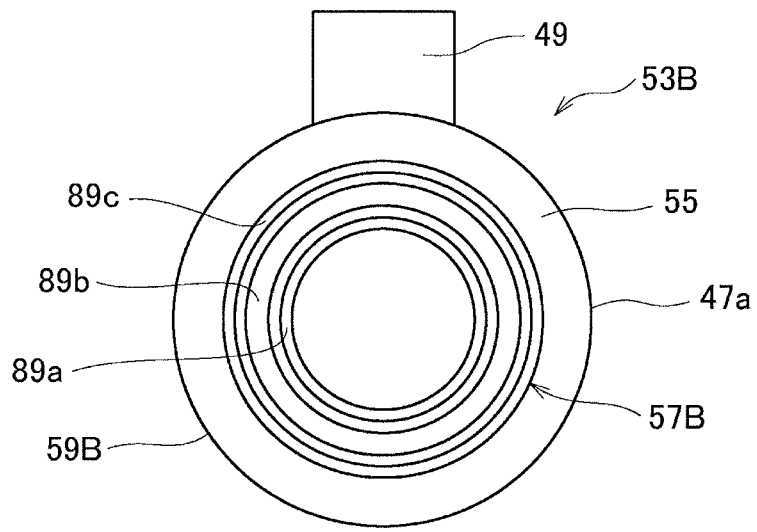
Figure 11C:
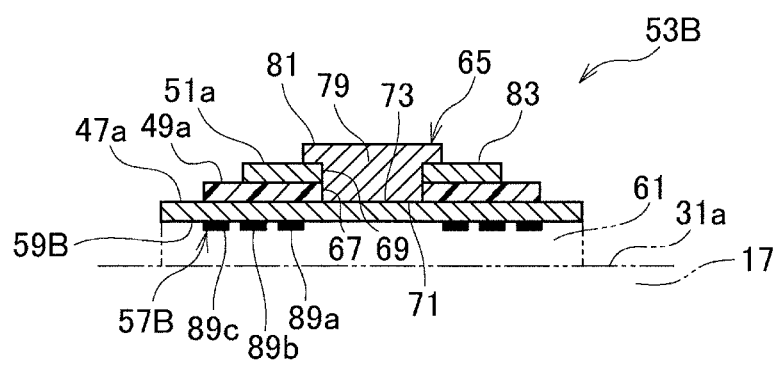

The modification illustrated in FIGS. 11A, 11B, and 11C forms the gold-plate layer 57B into plated rings 89a, 89b, and 89c that are concentric. The plated rings 89a to 89c have different diameters and are concentric. The intermediate plated ring 89b is wider than the other plated rings 89a and 89c. The plated rings may be formed into rectangular frames.

Figure 12A:
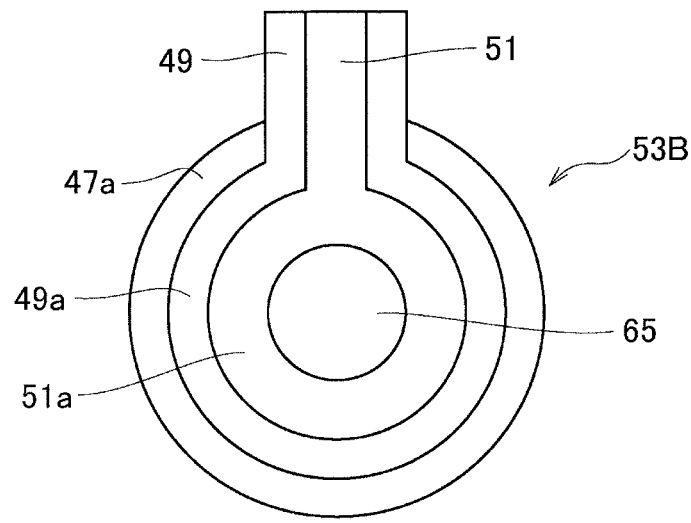
Figure 12B:
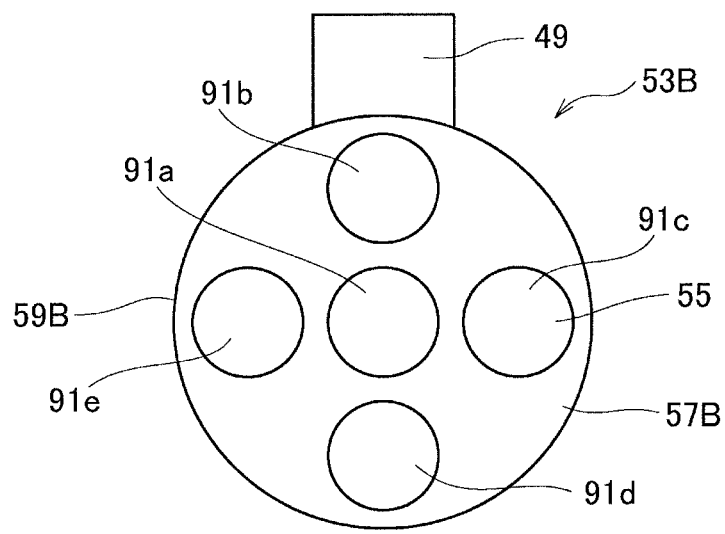
Figure 12C:
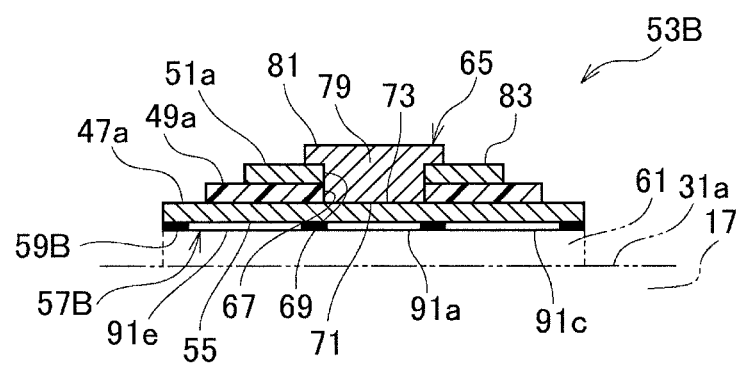

The modification illustrated in FIGS. 12A, 12B, and 12C forms circular exposed sections 91a to 91e in the gold-plate layer 57B. Instead of the circular plated sections 89a to 89e of the modification illustrated in FIGS. 9A to 9C, the modification illustrated in FIGS. 12A to 12C forms the circular exposed sections 91a to 91e to partially expose the metal layer 47a and covers the remaining part of the metal layer 47a with the gold-plate layer 57B. The number and plan shape of the exposed sections are optional like the modification of FIGS. 9A to 9C.

Figure 13A:
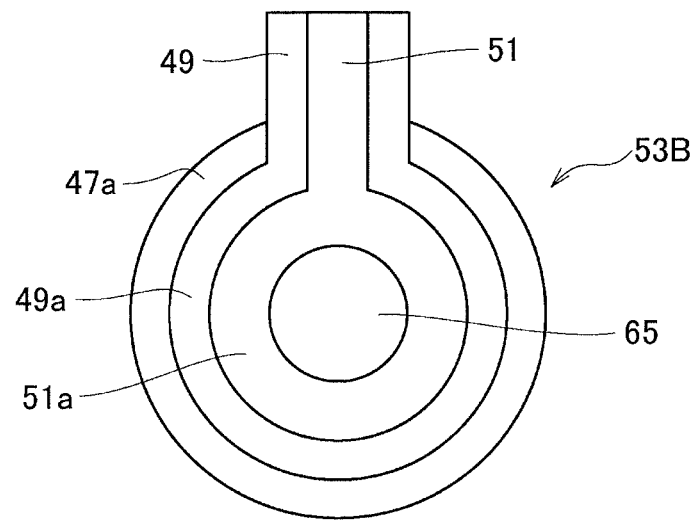
Figure 13B:
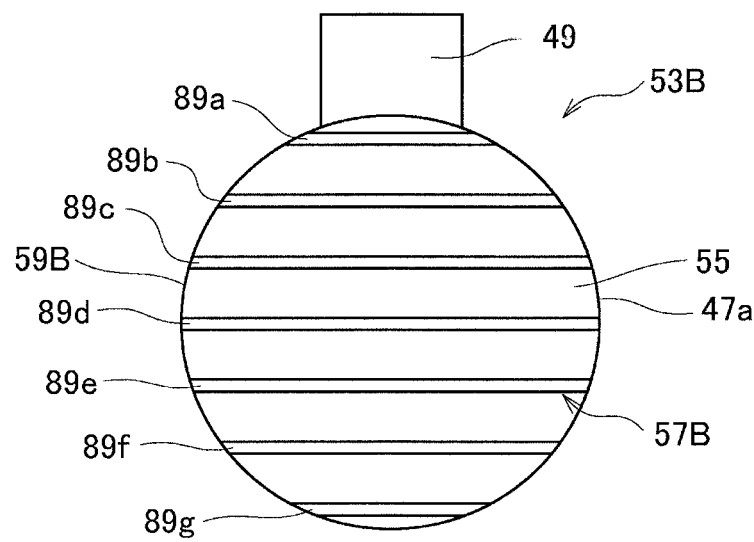
Figure 13C:
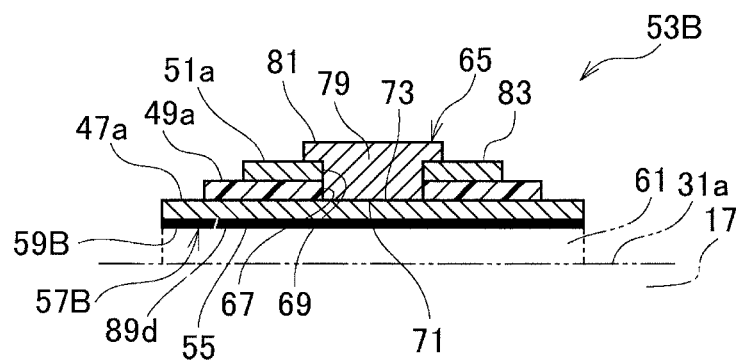

The modification illustrated in FIGS. 13A, 13B, and 13C forms the gold-plate layer 57B into a plurality of linear plated sections 89a to 89g arranged in parallel. The linear plated sections may be waved.

Figure 14A:
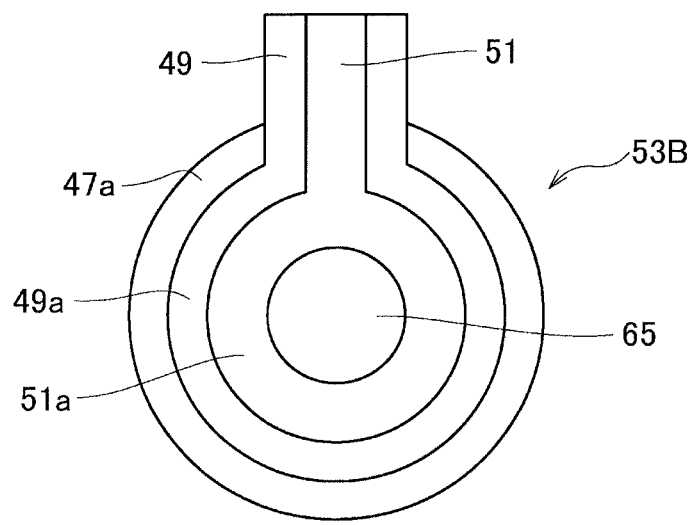
Figure 14B:
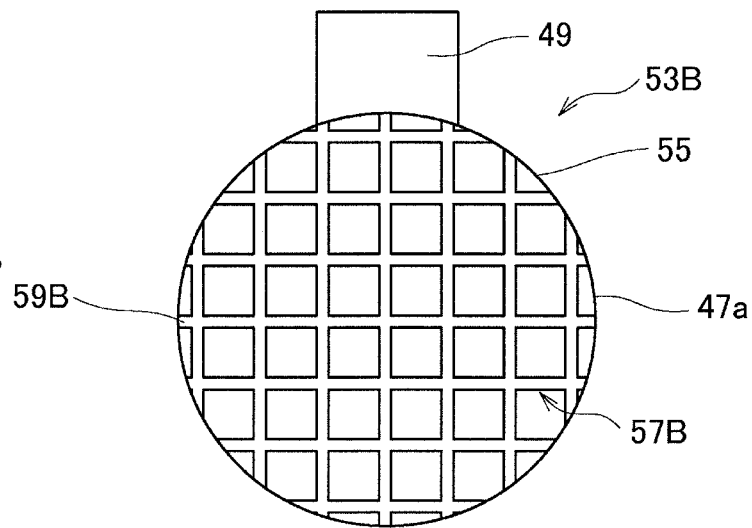
Figure 14C:
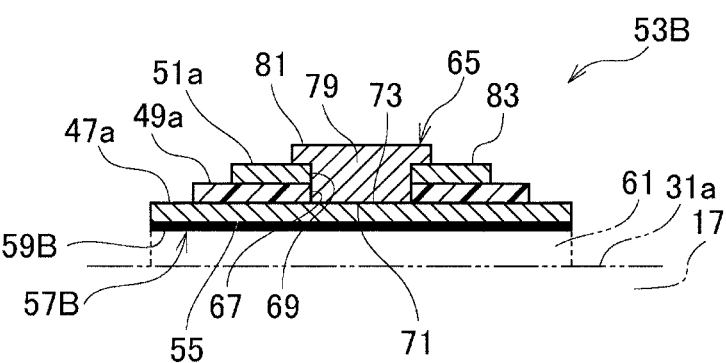

The modification illustrated in FIGS. 14A, 14B, and 14C forms the gold-plate layer 57B into a lattice. The number, size, and shape of elements of the lattice are optional.

According to the modifications of the third embodiment illustrated in FIGS. 9A to 14C, the terminal face 59B is a mixture of gold-plate components and metal-layer components, to provide effects similar to those of the third embodiment.

Figure 15A:
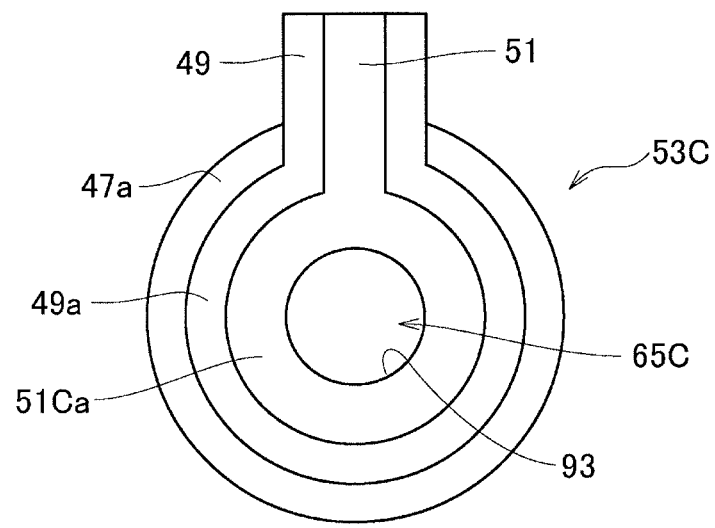
Figure 15B:
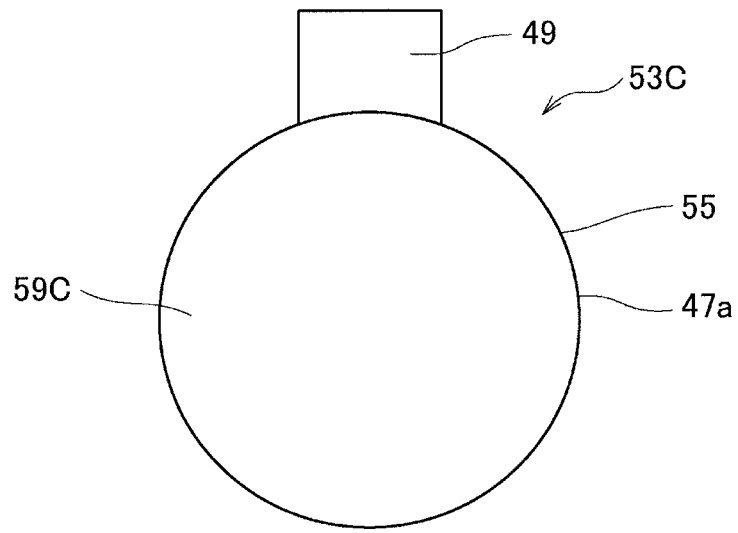
Figure 15C:
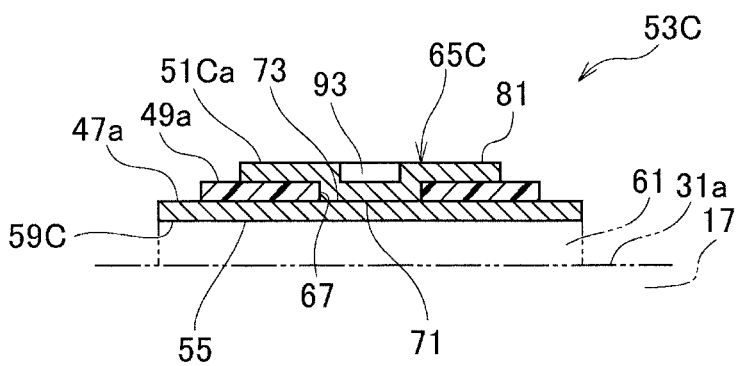

A terminal structure according to a fourth embodiment of the present invention will be explained with reference to FIGS. 15A, 15B, and 15C in which FIG. 15A is a plan view, FIG. 15B a back view, and FIG. 15C a sectional view corresponding to a sectional view taken along the line V-V of FIG. 1. The fourth embodiment is similar to the first embodiment, and therefore, corresponding parts are represented with like reference numerals or like reference numerals plus "C" to omit overlapping explanations.

Unlike the first embodiment that forms the ground via 65 separately from the wiring layer 51a, the fourth embodiment forms a ground via 65C integrally with a wiring layer 51Ca.

The ground via 65C is formed by bending the wiring layer 51Ca along an insulating layer hole 67, so that the ground via 65C integrally extends from the wiring layer 51Ca. The ground via 65C has a recess 93 opposite to a metal layer 47a.

The ground via 65C is formed when forming a wiring layer 51 of a flexure 45. Namely, the insulating layer hole 67 is formed through an insulating layer 49a of a terminal 53C and a wiring layer 51 of the flexure 45 is formed by, for example, plating. At this time, the wiring layer 51Ca and ground via 65C are simultaneously formed at the terminal 53C of the flexure 45.

The fourth embodiment omits a gold-plate layer like the modification of the first embodiment. The fourth embodiment may form the gold-plate layer like the first to third embodiments.

The fourth embodiment provides effects similar to those of the first embodiment. In addition, the fourth embodiment provides the effect of easily and surely forming the ground via 65C without additional processes.

Figure 16A:
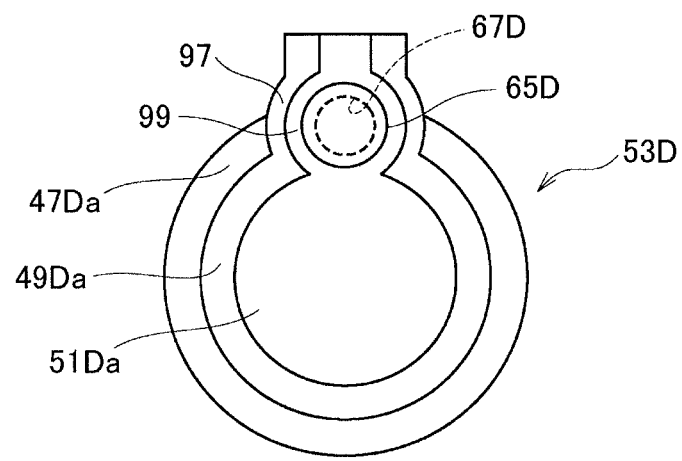
Figure 16B:
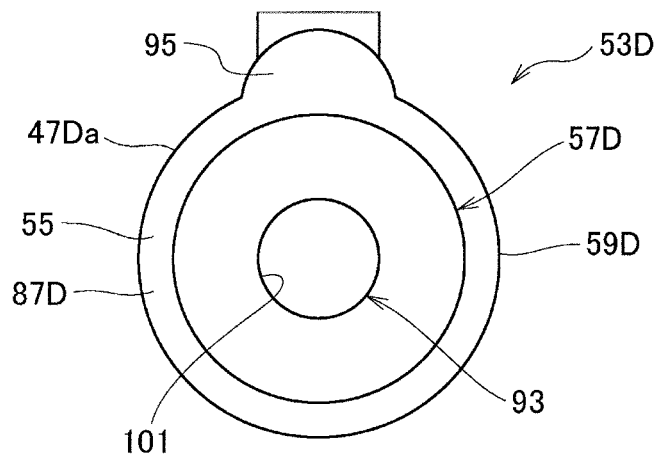
Figure 16C:
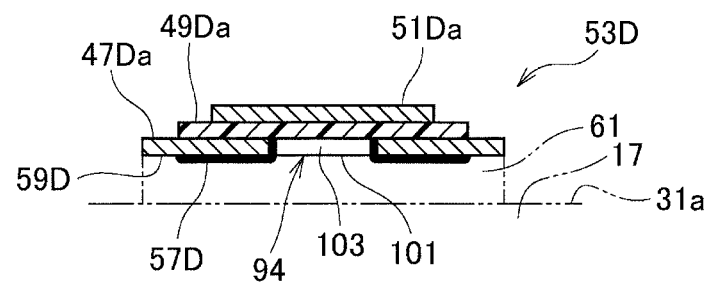

A terminal structure according to a fifth embodiment of the present invention will be explained with reference to FIGS. 16A, 16B, and 16C in which FIG. 16A is a plan view, FIG. 16B a back view, and FIG. 16C a sectional view taken along the line V-V of FIG. 1. The fifth embodiment is similar to the third embodiment, and therefore, corresponding parts are represented with like reference numerals or like reference numerals plus "D" to omit overlapping explanations.

The fifth embodiment forms a recess 94 in a terminal face 59D in a layered direction of the terminal structure. A ground via 65D is biased toward a base end side (flexure side) of a terminal 53D. The recess 94 in the terminal face 59D is formed at a central part of the terminal 53D.

To bias the ground via 65D, a metal layer 47Da, an insulating layer 49Da, and a wiring layer 51Da are provided with protrusions 95, 97, and 99, respectively. The protrusions 95, 97, and 99 protrude toward the base end side of the terminal 53D. The ground via 65D and an arrangement around the same may be similar to those of any one of the first and fourth embodiments.

The recess 94 in the terminal face 59D involves a recess hole 101 that is a circular hole with a circular cross section and is formed through the metal layer 47Da. The recess hole 101 is displaced from an insulating layer hole 67D formed through the insulating layer 49Da, so that the recess hole 101 does not communicate with the insulating layer hole 67D.

Into the recess hole 101, a gold-plate layer 57D formed on the metal layer 47Da partly enters to cover an inner circumferential face 103 of the recess hole 101. According to the fifth embodiment, the gold-plate layer 57D is formed on the metal layer 47Da except a circumferential peripheral area 87D of the metal layer 47Da like the third embodiment of FIGS. 5A to 8C. It is possible to omit the gold-plate layer 57D.

According to the fifth embodiment, a conductive adhesive 61 enters into the recess 94 of the terminal 53D at the time of assembling work, and in this state, the terminal 53D is adhered or bonded to a piezoelectric element 17.

The fifth embodiment uses the recess 94 of the terminal 59D as a spot to hold the conductive adhesive 61, thereby easily bonding the terminal 53D to the piezoelectric element 17. The recess 94 helps improve the bonding strength of the terminal face 59D with respect to the conductive adhesive 61.

Also, the fifth embodiment provides effects similar to those of the third embodiment.

Terminal structures according to modifications of the fifth embodiment will be explained with reference to FIGS. 17A to 18C. These modifications change the sectional shape of the recess hole 101.

Figure 17A:
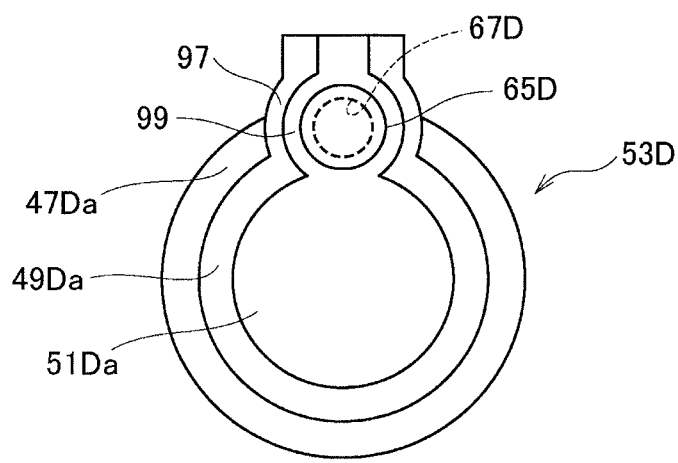
Figure 17B:
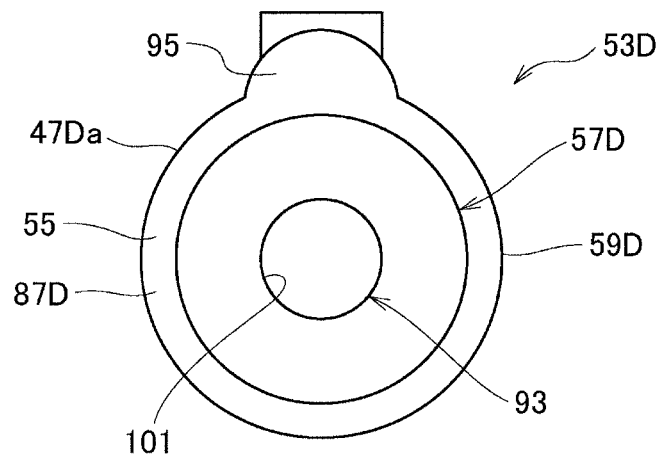
Figure 17C:
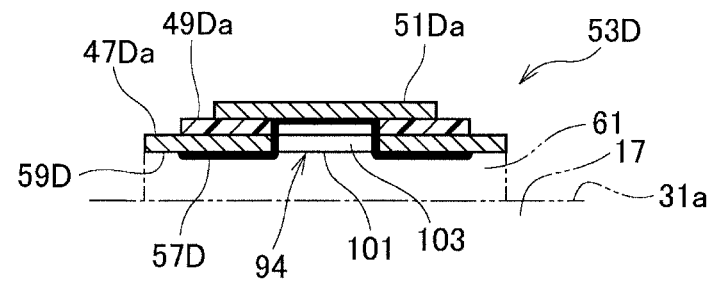

The modification illustrated in FIGS. 17A, 17B, and 17C forms the recess hole 101 through the metal layer 47Da and insulating layer 49Da, so that the wiring layer 51Da is exposed in the recess hole 101.

An exposed wiring part 105 of the wiring layer 51Da and an inner circumferential face 103 of the recess hole 101 are covered with the gold-plate layer 57D. Accordingly, not only the ground via 65D but also the gold-plate layer 57D electrically connect the wiring layer 51Da and metal layer 47Da to each other. It is possible to omit the gold-plate layer 57D.

This modification provides effects similar to those of the fifth embodiment. In addition, the modification improves electrical conductivity because the gold-plate layer 57D also realizes electrical connection between the wiring layer 51Da and the metal layer 47Da.

Figure 18A:
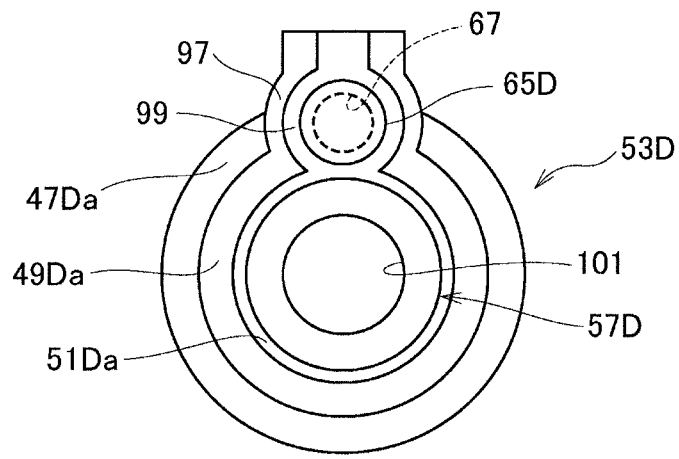
Figure 18B:
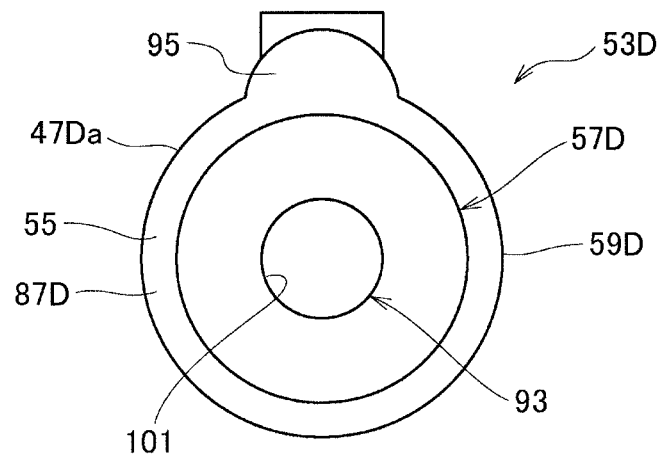
Figure 18C:
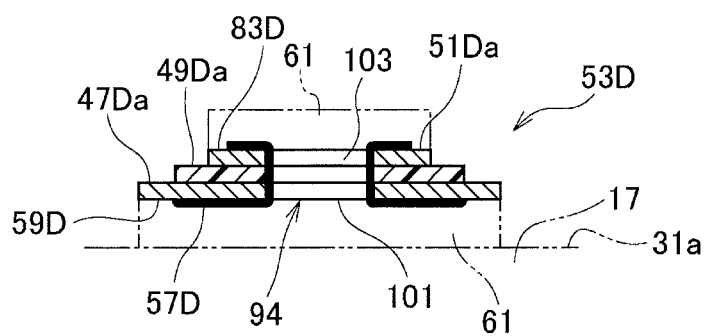
Figure 19A:
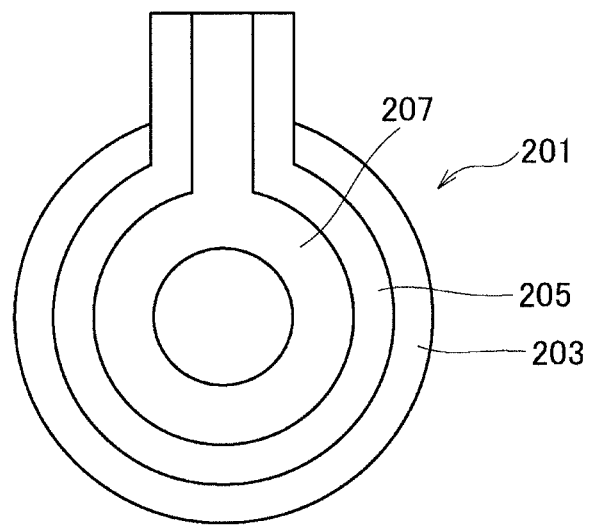
Figure 19B:
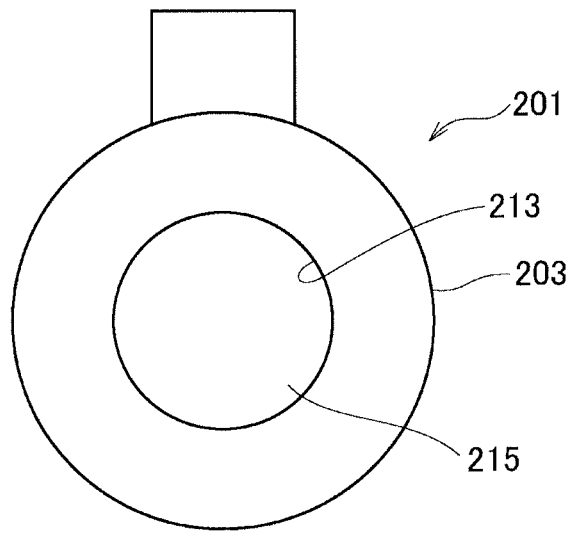
Figure 19C:
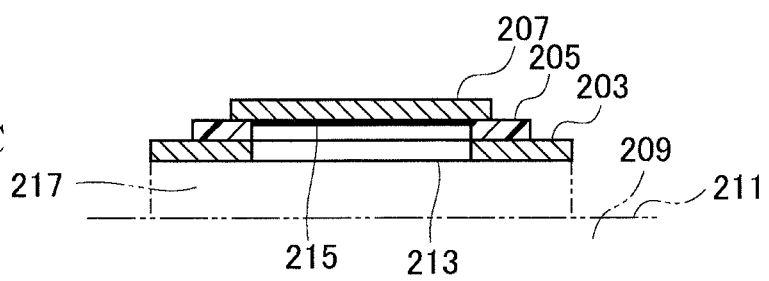

The modification illustrated in FIGS. 18A, 18B, and 18C forms the recess hole 101 through the metal layer 47Da, insulating layer 49Da, and wiring layer 51Da. The gold-plate layer 57D covers the inner circumferential face 103 of the recess hole 101 and a face 83D of the wiring layer 51Da. This modification electrically connects the wiring layer 51Da and metal layer 47Da to each other not only through the ground via 65D but also through the gold-plate layer 57D. It is possible to omit the gold-plate layer 5711

According to the modification, the terminal 53D is set to face the piezoelectric element 17, and in this state, the conductive adhesive 61 is filled in the recess hole 101 from the wiring layer 51Da side. This makes it easy to bond the terminal 53D to the piezoelectric element 17. At this time, the conductive adhesive 61 may be applied onto the wiring layer 51Da too, to improve bonding strength. In addition, the modification provides effects similar to those of the fifth embodiment.

Although the present invention has been explained with reference to the embodiments and modifications, the present invention is not limited to them and allows various changes and alterations.

For example, the gold-plate layer and recess explained in the embodiments and modifications may be combined in various ways.

The positions of the ground via and recess of the fifth embodiment may optionally be changed within a range in which they do not communicate with each other.

The position of the ground via in any one of the first to fourth embodiments may optionally be changed within a range in which the ground via electrically connects the wiring layer and metal layer to each other.

The wiring layer hole 69 and insulating layer hole 67 that form the via hole 63 are not always necessary to be aligned in the layered direction of the terminal structure. Namely, the via hole 63 is only required to pass through the wiring layer 51a and insulating layer 49a. For example, the via hole 63 including the wiring layer hole 69 and insulating layer hole 67 may be inclined in the layered direction if the via hole 63 passes through the wiring layer 51a and insulating layer 49a.

What is claimed is:

1. A terminal structure having a metal layer, an insulating layer formed on the metal layer, and a wiring layer formed on the insulating layer, the metal layer facing an electrode of a piezoelectric element, the wiring layer being electrically connected through a conductive bonding part to the electrode of the piezoelectric element, the terminal structure comprising:
an insulating layer hole being formed through the insulating layer in a layered direction of the terminal structure and having, when viewed in cross-section, a first opening portion proximal to the metal layer and a second opening portion proximal to the wiring layer, the first opening portion being in contact with a portion of the metal layer adjacent the first opening portion so that said first opening portion is terminated by said contact;
a back face of the metal layer facing the first opening portion and having the insulating layer formed on said back face:
a conducting part extending from the wiring layer and through the insulating layer hole to the back face of the metal layer so as to be connected at the back face of the metal layer, and electrically connecting the wiring layer and metal layer to each other; and
a terminal face defined on a surface of the metal layer opposite the back face, and bonded through the conductive bonding part to the electrode of the piezoelectric element.

2. The terminal structure of claim 1, further comprising a gold-plate layer formed on the terminal face.

3. The terminal structure of claim 2, wherein the gold-plate layer is formed so as to partly expose the metal layer.

4. The terminal structure of claim 3, wherein the gold-plate layer is formed by one of flash plating and plating with diffusion treatment.

5. The terminal structure of claim 3, wherein the gold-plate layer is partly formed on the metal layer.

6. The terminal structure of claim 1, further comprising a recess formed in the terminal face.

7. The terminal structure of claim 6, wherein the recess has a recess hole that is formed through at least the metal layer and is positionally shifted from the insulating layer hole.

8. The terminal structure of claim 7, wherein the recess hole is formed through the metal layer and insulating layer.

9. The terminal structure of claim 7, wherein the recess hole is formed through the metal layer, insulating layer, and wiring layer.

10. The terminal structure of claim 1, wherein the conducting part is integrally extended from the wiring layer.

11. The terminal structure of claim 1, further comprising:
a wiring layer hole that is formed through the wiring layer and corresponds to the insulating layer hole; and
a conductive material filled in the wiring layer hole and insulating layer hole and serving as the conducting part.

12. A flexure to be attached to a head suspension for supplying electricity to a piezoelectric element arranged in the head suspension, having the terminal structure of claim 1.

13. A head suspension comprising:
the flexure of claim 12;
a base;
a load beam attached to the base and supporting the flexure;
a head supported to the load beam, to write and read data; and
a piezoelectric element that is arranged between the base and the load beam, is connected through the terminal structure to the flexure, and is deformable according to a voltage applied through the flexure, to minutely move the head through the load beam in a sway direction with respect to the base.

* * * * *